Jan. 16, 1968 G. REITZ ET AL 3,364,473
DATA DISPLAY SYSTEM
Filed Oct. 5, 1964 6 Sheets-Sheet 1

INVENTORS
GERHARD REITZ
JULES MERSEL
JAMES F. EVERETT
BY
Abraham Wasserman
ATTORNEY Jan. 16, 1968 G. REITZ ET AL 3,364,473

DATA DISPLAY SYSTEM

Filed Oct. 5, 1964 6 Sheets-Sheet 3

INVENTORS
GERHARD REITZ
JULES MERSEL
JAMES F. EVERETT
BY
Abraham Wasserman
ATTORNEY

DATA DISPLAY SYSTEM

Filed Oct. 5, 1964 6 Sheets-Sheet 3

| STATE | FD 03 | FD 02 | FD 01 |
|---|---|---|---|
| $D_0$ | 0 | 0 | 0 |
| $D_2$ | 0 | 1 | 0 |
| $D_3$ | 0 | 1 | 1 |
| $D_4$ | 1 | 0 | 0 |

INVENTORS
GERHARD REITZ
JULES MERSEL
JAMES F. EVERETT
BY Abraham Wasserman
ATTORNEY INVENTORS
GERHARD REITZ
JULES MERSEL
JAMES F. EVERETT
BY
Abraham Wasserman
ATTORNEY INVENTORS
GERHARD REITZ
JULES MERSEL
JAMES F. EVERETT
BY
Abraham Wasserman
ATTORNEY INVENTORS
GERHARD REITZ
JULES MERSEL
JAMES F. EVERETT
BY
Abraham Wasserman
ATTORNEY United States Patent Office
3,364,473
Patented Jan. 16, 1968

3,364,473

DATA DISPLAY SYSTEM

Gerhard Reitz, Los Angeles, Jules Mersel, Sherman Oaks, and James F. Everett, Thousand Oaks, Calif., assignors to The Bunker-Ramo Corporation, Canoga Park, Calif., a corporation of Delaware Filed Oct. 5, 1964, Ser. No. 401,317
10 Claims. (Cl. 340—172.5)

ABSTRACT OF THE DISCLOSURE

A system for translating data expressed in a first language to substantially equivalent data expressed in a second language. The system includes data processing means, responsive to signals representing the data to be translated, for providing unedited data expressed in the second language. This unedited data is displayed on a first display surface, e.g., the upper half of a cathode ray tube screen. Manually actuatable means are provided enabling an operator to selectively enter new data onto a second display surface as well as copy data onto the second display surface from the first display surface.

This invention relates to machine translation systems and, more particularly, to a method and system for editing automatically translated data to obtain improved data of acceptable translation standards.

In recent years, the use of high capacity computers has been extended to the field of data translation. Computers have been programmed to receive input data in one language and after automatically performing various linguistic comparisons and computations provide related output data in a different language. For example, Russian articles or books can at present be translated automatically into English.

Generally, a computer used in machine translation is initially provided with basic data interrelating the languages of the input and desired output data. Such basic data usually comprises grammar-coded dictionaries and basic syntax rules of the two languages, which hereinafter will be referred to as the input and output languages. In operation, each word of the input language is examined by the computer to determine its equivalent meaning in the output language, so as to print out the equivalent word. Also, on the basis of the syntax data, the computer automatically rearranges the printed-out words so that they are correctly placed within each sentence.

Such translating steps are similar to those usually performed by trained translators, who, being able to recall the infinite number of translation variations, as well as all the multiple meanings that certain words possess, are capable of translating one language directly to another. However, even the largest computer presently known cannot be supplied with all the instructions necessary to define all the possible translation variations, as well as sufficient rules to determine which meaning out of a multiplicity of possibilities should be used in any given situation.

Consequently, output data automatically translated by presently known systems is not completely satisfactory. Such data usually includes sentences which though made up of all the desired words in the output language, are grammatically incorrect. Namely, the sentences are improperly constructed from a syntactic point of view. Also, words in the input language which have multiple meanings in the output language are represented in the output data by a plurality of words. That is, the computer not having sufficient information to determine which of the words to select as the proper translation of a given input word, provides all the possible words of multiple meanings.

Quite often the computer does not store an equivalent word for a given input word, resulting in a deficiency in translation information. In such cases, the computer provides the input word in the input language as part of the output data in the output language, thereby requiring a human translator to supply the necessary translation.

A manual translator or editor is also necessary to complete the translating operation by including other data which, due to the computer's limited capacity, are not automatically translated or reproduced. For example, data relating to mathematical formulas or symbols, graphs and other nonalphanumeric characters are generally not stored in the computer. Thus, such data which may appear in the input data needs to be manually transposed into the output data.

Typical output data automatically provided by even the best machine translation systems, therefore, include a certain amount of data which must be refined before the translated data can be recorded as satisfactory. At present, such data is typed out by the system with all the aforementioned possible undesirable limitations. Thereafter, a translator or editor reviews the output data to translate words which the system omitted. Also the translator selects one of the multiple meanings which may be presented in the output data for a given input word. In addition, the translator rearranges certain sentences so that they are grammatically properly constructed. In extreme cases, the translated sentence is so disarranged that the translator resorts to the original text in the input language in order to determine the exact meaning, and to select the most adequate translation. These changes are usually done by the translator on the typed-out data produced by the system. Thereafter, the edited copy is retyped to provide the final desired output data. The changes introduced by the editor are often quite extensive, resulting in highly edited typed data with many interlineations and corrections. Therefore, the retyped task becomes difficult and time consuming.

The amount of time and expense incurred in editing machine translated data to provide a satisfactory record often determine the economic soundness of automating the translating process. In some systems where the machine-provided output data is very poor, necessitating extensive editing, the overall cost of the translated data does not justify the use of such systems over translators or linguists who can perform the necessary translating tasks at less cost.

The present invention comprises a method and system for editing machine translated output data to provide a typed out final record in which all the translational modifications performed during the editing process are automatically incorporated. Finally, the present invention is based on the automatic electronic intercoupling of the computer, which automatically translated the input data into related unedited output data, with a display system which is controllable by an editor or translator. The editor views the unedited output data, automatically supplied to the display system. On the basis of the displayed data, the editor introduces all the necessary translational modifications and additions. By manually controlling a display control console these introductions are automatically incorporated in the unedited output data, to provide a display of data which includes all such changes. Thus, the editor may repeatedly change the data being displayed until he is satisfied that the edited data meets the desired translation standards. At such time, the editor controls the system to automatically provide a typed out record of the acceptable edited displayed data.

In operation, a portion of the machine-translated unedited output data such as a paragraph, is displayed on a part of a display surface. The other part of the surface is used to modify and/or augment the unedited portion being displayed. Thus, at any given time, the editor views the exact output data provided by the machine, as well as the results of the editing of such data by his additions and/or modifications. A special display control unit enables the editor to select all or any desired parts of the unedited displayed data to be used as part of the edited data.

Also, the editor may by using the display control unit introduce new characters or symbols not included in the machine translated output data, so that the edited data is a satisfactory translation of the input data supplied to the computer. A data input unit is under the editor's control to add or input the characters or symbols which the computer did not produce, due to lack of programming and/or other capabilities. For example, the editor may by means of the data input unit introduce into the edited displayed data, mathematical expressions and/or symbols which have not been reproduced from the original input data into the machine-translated output data.

Once the edited displayed data includes all necessary symbols and is grammatically correct, the editor directs the system to type out the edited display data as a permanent record.

The novel display system of the invention thus enables an editor to view unedited translated data which a translating computer provides to a display system. On the basis of the displayed data, the editor performs various editing steps, and, once satisfied that the edited data meets desired translation standards, the editor causes the system to type out a permanent record. The permanent record is an edited translated output which present language machine translation systems cannot provide.

The novel features which are believed to be characteristic of the invention, together with other advantages thereof, will be better understood from the following description taken in conjunction with the accompanying drawings, in which.

Figure 1:
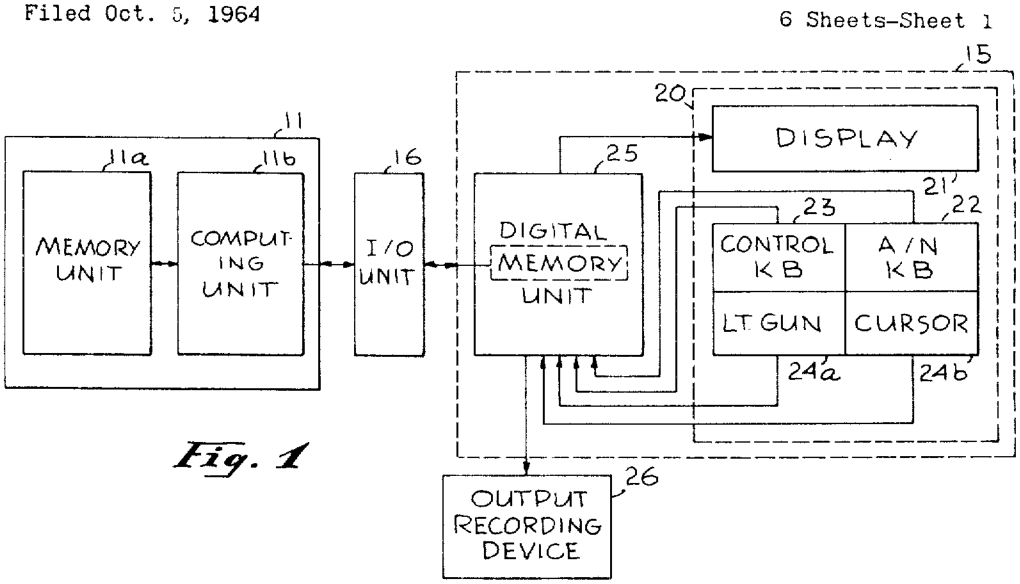
FIG. 1 is a general block diagram of an embodiment of the present invention.

Reference is now made to FIG. 1 which is a generalized block diagram of the system of the present invention. As seen therein, the system includes a translating computer 11 which comprises input and output stages (not shown) and a memory unit 11*a* interconnected with a computing unit 11*b*. In operation, the computer 11 is supplied with input data in an input language which is to be automatically translated by the computer into unedited output data in an output language. The input data is supplied to the memory unit through the input stage and is temporarily stored, together with information or data interrelating the linguistic and grammatical characteristics of the two langauges. Thereafter, each element of the input data such as a word or a symbol is compared in the computing unit 11*b* with the data stored in the memory unit 11*a* which interrelates the two languages, so that an equivalent word in the output language may be found. After all the elements of the input data are compared with the stored information in the memory unit 11*a*, the equivalent words in the output language are temporarily stored in the memory unit. Thereafter, the words are automatically rearranged by the translating computer so that the unedited output data in the output data in the output language is grammatically as correct as the computer can automatically determine on the basis of the prestored linguistic and grammatical characteristics of the output language.

The unedited automatically translated data in the output language is stored in the memory unit 11*a* so that at least portions thereof may be sequentially supplied to a display unit 15 through an input and output unit 16. The display unit 15 comprises an operator's console 20 and a digital memory unit 25. The console 20 is directly coupled to the digital memory unit 25 so that portions of the information stored in the memory are displayed on the console 20 as will be hereinafter described. In addition, the memory unit 25 is interconnected with an output recording unit 26 so that when the information displayed on the console 20 is of desired characteristics, the output recording unit 26 may be energized through the digital memory unit 25 to record at least some of the desired displayed data as will be hereinafter explained in detail.

Figure 2:
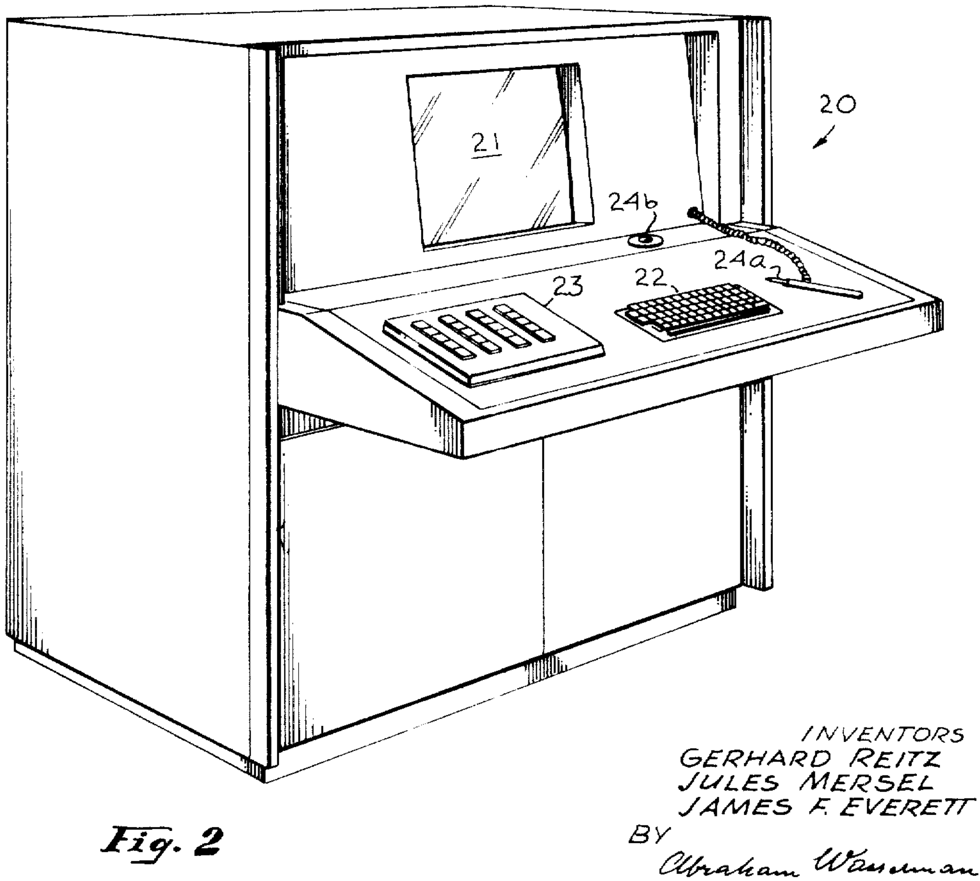
FIG. 2 is a perspective view of a console forming part of the apparatus of the invention.

Reference is now made to FIG. 2 which is a perspective view of the operator's console 20. The console 20 includes display means 21 such as a cathode ray display tube, which is controlled by signals from the digital memory unit 25. In addition, the console 20 is provided with a plurality of control keyboards including alphanumeric keyboard 22 and a program keyboard 23. The keyboards 22 and 23 are interconnected with the digital memory unit 25 so as to enable an operator to control the operation of the unit 25, as well as control the information displayed on the display means 21. The console 20 further includes a light gun apparatus 24*a* and a cursor apparatus 24*b* which are under the control of the operator to enable him to respectively identify to the digital memory unit locations and specific points on the display means 21.

In operation, the translating computer 11 supplies a portion of the unedited data translated in the output language to the digital memory unit 25 wherein it is temporarily stored. A display operation is cyclically performed in which the content of the digital memory unit 25 is sequentially accessed and supplied to the console 20 for generating a visual display on the display means 21. More particularly, in the absence of the actuation of any of the keys on the various keyboards, the system will function merely to display that information which is stored in the digital memory unit. Inasmuch as a cathode ray tube is contemplated for use as the display means 20, the information displayed thereby must be continually refreshed and, consequently, it requires that the memory be completely accessed every certain interval.

The information displayed on the surface of the cathode ray tube occupies only a portion there, the rest of the display surface being available for editing the displayed data or information, so that both the unedited data and the edited data may be displayed at the same time. Thus, the operator may observe the effects of the translation editing performed by him, and thereby determine the next step to be performed.

Figure 3:
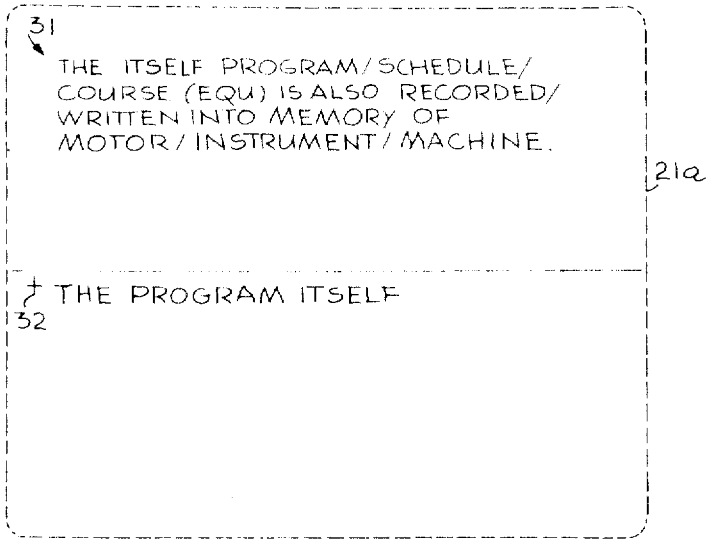
FIG. 3 is a diagrammatic front view of a display surface displaying data useful in explaining the present invention.

For a better understanding of the translation editing performed by the operator, reference is now made to FIG. 3 in which is shown an example of unedited data 31 displayed on display surface 21*a* of the cathode ray tube 21 in response to the automatically translated data from the translating computer 11. The unedited data 31 which occupies the top portion of the display surface 21*a* is shown expressed in the English language, with several words being separated by bars. Such words represent multiple meanings in the English language for a given word in the input language and the translating computer 11, due to limitations in the linguistic and grammatical information prestored therein, could not determine which of the multiple means is the most appropriate.

Thus, the system is operated to display all the multiple meanings, leaving it up to the operator to select the appropriate one. In addition, the data displayed on the display surface also indicates that an equation (EQU) which could not be supplied to the translating computer 11 as part of the input data needs to be supplied in the edited output data. In practice, the operator views the displayed sentence and on the basis of his linguistic knowledge, rearranges the words, as well as selects the appropriate word out of the plurality of multiple meanings, so that the edited data or sentence meets satisfactory translation standards. In addition, the operator supplies the equation which the computer did not include in the unedited data translated therein.

The display console 20 hereinbefore described is used by the operator to accomplish the editing tasks as conveniently and as speedily as possible. This is accomplished by enabling the operator to electronically select any of the words displayed in front of him and include them in the final edited output data. The selection is performed by actuating the keyboards 22 and 23 of the operator's console 20. By so actuating the keys, the selected data is simultaneously displayed together with the unedited data, so that at any given time, the operator may observe both the unedited data supplied by the computing machine, as well as the edited data reconstructed by him. For example, the operator may cause the system to display auxiliary symbols which enable him to select a word from the unedited data for incorporation into the edited portion reproduced by him. In addition, the operator may resort to the alphanumeric keyboard 22 to add words in the edited data which do not appear in the translated data automatically produced by the translating computer 11. In the foregoing example, the operator may use the alphanumeric keyboard 22 to type in the equation which the translating computer 11 did not translate, or reproduce.

The control keyboard 23 includes a plurality of keys, each one coupled to a different switch. In the particular embodiment described herein, the switches control the following operations in the apparatus, and may be so labeled:

| | |
|---|---|
| SW01 | CREATE BLINKER |
| SW02 | BLINKER FORWARD |
| SW03 | BLINKER BACK |
| SW04 | DELETE BLINKER |
| SW05 | CREATE MARKER |
| SW06 | MARKER FORWARD |
| SW07 | MARKER BACK |
| SW08 | DELETE MARKER |
| SW09 | COPY WORD |
| SW10 | INSERT WORD |
| SW11 | A/N KEYBOARD COPY |
| SW12 | A/N KEYBOARD INSERT |
| SW13 | COPY EDIT AREA |
| SW14 | CLEAR MEMORY |
| SW15 | STORE NEW DATA |

Figure 4:
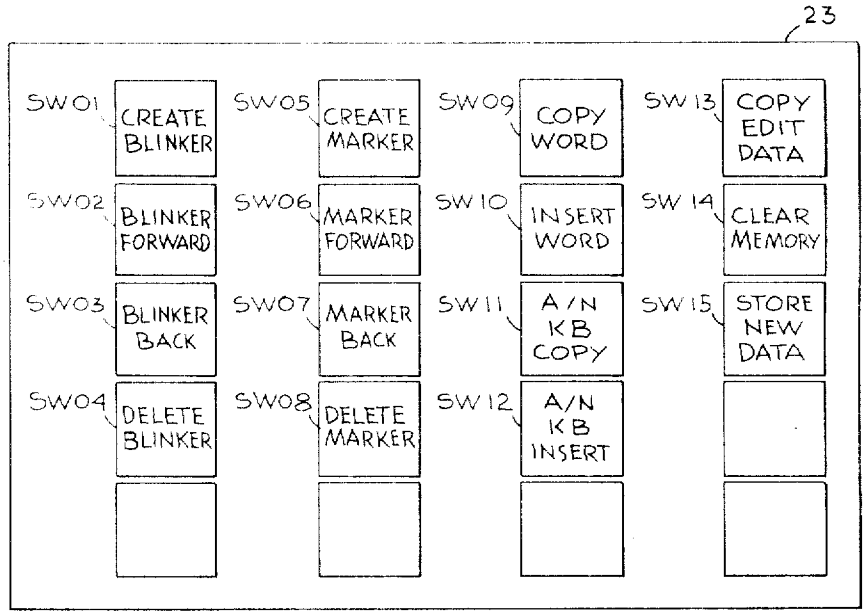
FIG. 4 is a top view of a control keyboard used to activate the system in different modes of operation.

The switches SW01–SW15, which may be arranged in a matrix as shown in FIG. 4, are of the momentary closure type such that, when any one of the keys is actuated, the switch associated therewith closes momentarily and then reopens. That is, regardless of how long the key is actually depressed, the switch associated therewith will close only for a predetermined momentary period. The actuation of any of the switches causes the digital memory unit 25 to perform various operations on the data stored therein, so that the data displayed on the surface 21*a* of the cathode ray tube 21 includes auxiliary symbols and/or modifies the displayed data in accordance with the editing instruction of the operator. For example, by depressing switch SW01 which is the CREATE BLINKER switch, the first character of the first word displayed in the upper lefthand corner of the cathode ray display surface starts blinking. Thus, the letter T of the first word THE blinks. Also, by momentarily depressing switch SW05, a marker is created. The marker appears on the upper lefthand corner of the lower half of the display surface of the cathode ray tube.

In FIG. 3, the marker is shown as a plus sign (+) designated by numeral 32. In operation, if the operator decides that the word, the first character of which is blinking, should be included in the edited data at the position indicated by the marker, he depresses the switch SW09 which causes the word to be copied. Thus, the blinking word is displayed at the position of the marker, and the marker moves to the right into the second space after the last character of the copied word. In the example shown in FIG. 3, the operator will copy the word THE, so that thereafter the marker will automatically move and be positioned in the second space to the right of the letter E of the word THE. Similarly, the blinker will automatically move and start blinking the letter I of the next word ITSELF. However, from the sentence displayed by the cathode ray display tube, it is seen that the word ITSELF is not to follow the first edited word THE, but rather, the word PROGRAM should be the next edited word. Thus, the operator will depress the switch SW02 to move the blinker forward until the letter P of the word PROGRAM starts blinking. The word PROGRAM is then caused to be displayed after the word THE by again depressing the COPY WORD switch SW09. The operator then depresses the BLINKER BACK switch SW03 until the I of the word ITSELF blinks so that after displaying the words THE PROGRAM on the bottom half of the display surface of the cathode ray tube, the third word to be displayed thereon is the word ITSELF, the three words being shown in FIG. 3 on the bottom half of the display surface 21*a*. It should be noted that once a word is included in the edited portion, the marker will no longer appear at the upper lefthand corner, but rather, will be positioned according to the operator's controls.

The operator continues to manipulate the keys associated with the switches which control the operation of the blinker and the marker, so as to display in the edited portion of the data words which appear in the unedited data. The edited words are arranged to conform with acceptable translation standards, so that the sentences produced are grammatically correct. When reaching a point in the editing process where data should be included which do not appear in the unedited data displayed on the top portion of the display surface, the operator resorts to the alphanumeric keyboard 22 (FIGS. 1 and 2). The keyboard, which is similar to a typewriter keyboard, is then used to insert or copy alphanumeric expressions to be included in the edited displayed data. For example, after displaying on the bottom half of the display surface, the words THE PROGRAM ITSELF, the next data to be displayed therein is the equation which the computer 11 did not reproduce. Thus, the operator, knowing the expression of the equation, types it in by means of the alphanumeric keyboard 22. Thereafter, the operator depresses switch SW11 which controls the A/N keyboard copying operation. Consequently, the equation is displayed after the word ITSELF.

If, at any time during the editing operation, the operator determines that a certain word should have been inserted in the edited data, such insertion to occur between editing words already displayed, the operator may resort to the insertion switches SWW10 and SW12. By actuating either of these switches, data may be inserted at any point between words on the bottom portion of the display surface 21a. By actuating these switches, the digital memory unit 25 is operated to make room for the word or words to be inserted, as well as to shift the location of the words to follow such inserted expressions so that at every single display location on the display surface only a single character is displayed without any overlap of displayed characters.

After completing the editing operation on any unedited data displayed on the top half of the display surface, the operator depresses switch SW13, thereby energizing the digital memory unit to cause the output recording unit 26 to record the edited data displayed on the bottom half of the display surface. Once the edited data has been recorded, the system is energized by means of switch SW14 to clear the memory of the digital memory unit 25. Thereafter, switch SW15 is depressed, thereby energizing the system to cause the translating computer 11 to transfer a second portion of the unedited data stored therein to the digital memory unit 25. Therein the portion is temporarily stored so as to display such data on the display surface, and thereby enable an operator to view a new portion of unedited data for editing purposes as hereinbefore described.

From the foregoing, it is thus seen that machine-translated data in a desired output language may be convenientyl edited by using the display system incorporated in the present invention. The editing greatly improves the linguistic characteristics of the machine-translated data to provide translated data of acceptable translation standards. For example, the unedited translated data shown in FIG. 3, though expressed in the English language, is unsatisfactory from a grammatical point of view. However, the same unedited data, once modified to read THE PROGRAM ITSELF IS with a particular equation being inserted between the words ITSELF and IS, would form part of a correct English sentence of acceptable standards. According to the teachings of the present invention, the system may display, together with the unedited data translated by the translating computer, the original data in the input language. Thus, the operator may view both the input and output data of the translating computer to thereby enable him to edit the data produced by the machine so that the final translated data is the best possible translation of the input data in the input language.

Figures 5, 6:
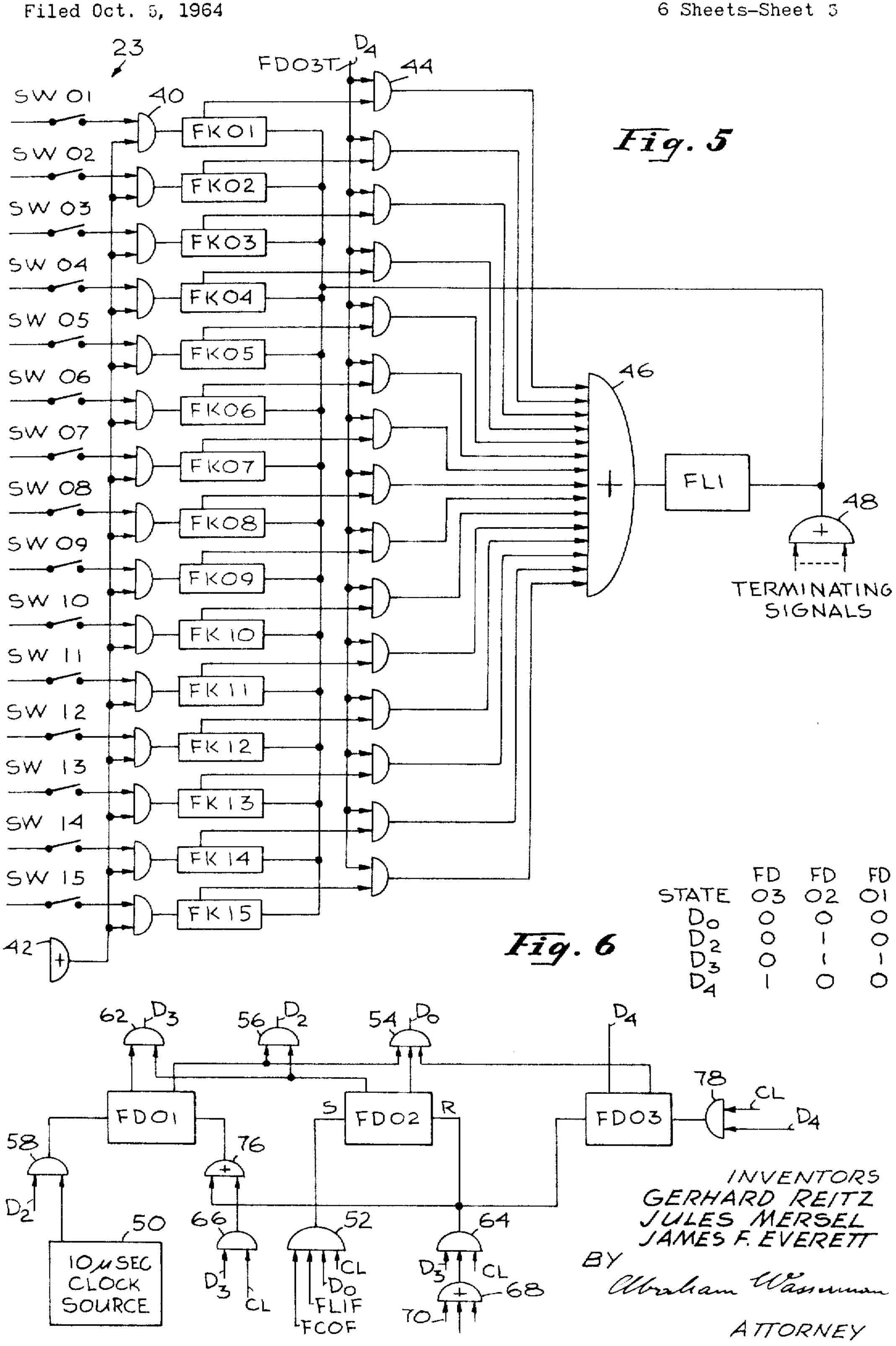
FIG. 5 is a partial circuit-diagram of the control keyboard.
FIG. 6 is a diagram of a display state counter embodied in the apparatus.

Attention is now called to FIG. 5 which diagrammatically illustrates the control keyboard 23 together with apparatus responsive thereto. As previously stated, in the normal operation of the system of FIG. 1, a display operation is cyclically performed in which the contents of the digital unit memory locations are sequentially accessed and supplied to the console for generating a visual display. More particularly, in the absence of the actuation of any of the keys on the various keyboards, the system will function merely to display that information which is stored in the digital unit memory.

Both symbol and control words are stored in the memory locations, each word being represented by a different digital code. The total number of different symbols which can be displayed by the console cathode ray tube will be assumed to be 64 and will include alphabetic, numeric and other symbols. In order to represent 64 different symbols, 64 different codes must be defined which requires the utilization of words at least six bits in length. Among the various other symbols which can be displayed, the marker symbol is of particular significance because it is used to identify the display positions and corresponding memory locations into which data is to be copied or inserted. Codes are also provided to represent spaces, commas, periods, etc. It can be considered that each memory location corresponds to a different elemental display area and thus a symbol code stored in that location will be displayed in the corresponding display area.

More particularly, each memory location address is translatable into X and Y deflection signals by means (not shown) for deflecting the beam in the cathode ray tube.

As seen from FIG. 5, each of the switches SW01 through SW15 is connected to the input of an associated AND gate 40. The second input to each AND gate 40 is connected to the output of an OR gate 42 to whose input are applied various signals representing "not ready" conditions, as would be generated in the event that transients initiated by prior operations had not yet died out. The output of each of the AND gates 40 is connected to the set input terminal of a different conventional set-reset flip-flop FK01 through FK15. It is pointed out that unless otherwise indicated, all of the flip-flops to be discussed herein utilize conventional set-reset circuitry. The terminal extending from the left side of the box representing the flip-flop constitutes the flip-flop set input terminal and the terminal extending from the right side, the reset input terminal. The true and false flip-flop output terminals respectively extend from the left and right sides of the upper surface of the flip-flop box.

The true output terminal of each of flip-flops FK01 through FK15 is connected to the input of a different one of AND gates 44. A second input to each of the AND gates 44 is derived from the true output terminal of flip-flop FD03 which comprises one stage of a display cycle state counter which will be specifically described hereinafter. When flip-flop FD03 is true, display cycle state 4 is defined which indicates that the display cycle is ending and a keyboard cycle can be initiated. The output of each of the AND gates 44 is connected to the input of an OR gate 46. The output of OR gate 46 is connected to the set input terminal of a logic flip-flop FL1. The output of an OR gate 48 is directly connected to the reset input terminal of flip-flop FL1 and to the reset input terminals of each of flip-flops FK01, through FK15. Inputs to the OR gate 48 are derived from sources of terminating signals which are suppled in response to the termination of each of the keyboard cycles initiated in response to the actuation of one of the control keys.

Attention is now called to FIG. 6, which illustrates the display cycle state counter including flip-flop stages FD01, FD02, and FD03. The table in FIG. 6 illustrates the states defined by each of the flip-flops for each display cycle state. As will be seen in the discussion of figures to follow, during display cycle state $D_2$, information is read from the digital memory, and during display cycle state $D_3$ information is written back into the digital memory. It is pointed out that the digital memory referred to herein is assumed to be a random access destructive readout memory of, e.g., the single aperture magnetic core type. The operation of this type of memory generally requires that subsequent to each reading operation, there be a restoring or writing operation to reset the states of the magnetic cores which states were obliterated during the read operation. Although this type of memory has been assumed, it is in no way to be understood that the inventive teachings herein depend upon the type of memory utilized. Thus, for example, a random access non-destructive readout memory or a nonrandom access non-destructive readout memory could be equally as well employed.

A source 50 of periodically generated clock pulses spaced by a fixed interval, nominally 10 microseconds, is provided. The output of the source 50 is coupled to the input of each of the gates whose outputs are connected to the display cycle state counter flip-flops so that the counter is capable of changing state only in synchronism with the pulses provided by the source 50. The display cycle state counter counts in a fixed sequence starting with state $D_0$. From state $D_0$ the counter switches to state $D_2$ for the purpose of reading the initial word from the digital unit memory. Thence, the counter switches to state $D_3$ in order to write back the information into the memory and thence to state $D_2$ to read the subsequent word from memory. The counter switches between states $D_2$ and $D_3$ until a terminal memory address reached or until some other terminating condition is met. In response to encountering a terminating condition, the display cycle counter switches from state $D_3$ to state $D_4$ and thence to state $D_0$. The display cycle will then begin again by assuming state $D_2$ if no other functions are to be performed.

More particularly, note that in order to switch from state $D_0$ to state $D_2$, flip-flop FD02 has to be set. Connected to the set input terminal of flip-kop FD02 is the output of an AND gate 52. The output of a decoding gate 54 providing a true signal representative of state $D_0$ is connected to the input of gate 52 along with the output of clock source 50. In addition, the false output terminal of previously mentioned logic flip-kop FL1 is connected to the input of gate 52. Logic flip-flop FL1 will be true when a keyboard cycle is to be initiated and consequently, when it is true, the display cycle state counter is held in state $D_0$. Also, the display cycle counter is held in state $D_0$ when a computer cycle flip-flop FCO is true. The flip-flop FCO will be true whenever the computer 11 signals that it is ready to modify the contents of the digital unit memory. When all of the inputs to gate 52 are true, that is to say when there is no reason to hold the display cycle counter in state $D_0$, flip-flop FD02 is set to thereby define state $D_2$. State $D_2$ is decoded by an AND gate 56 whose output is connected to the input of an AND gate 58 along with the output of clock source 50.

State $D_3$ is decoded by an AND gate 62. The output of AND gate 62 is connected to the input of both AND gates 64 and 66. The output of clock source 50 is also connected to the inputs of both gates 64 and 66. The output of OR gate 68 is connected to the input of AND gate 64. Two inputs to the OR gate 68 are provided, each respectively responsive to a different terminating condition for presenting a true signal. More particularly, conductor 70 connected to the input of gate 68 provides a true output signal whenever the address of the last accessed memory location corresponds to a maximum address established in accordance with a designated one of several possible criteria. The conductor 72 is provided with a true signal in response to a marker being located in the digital memory whenever a marker is being sought for purposes of performing one of the keyboard cycles. The output of gate 64 is connected to the set input terminal of flip-flop FD03, to the reset input terminal of flip-flop FD02, and through an OR gate 76 to the reset input terminal of flip-flop FD01. The output of AND gate 66 is also connected to the input of OR gate 76.

When the flip-flop FD03 is true, display cycle counter state $D_4$ is defined. The true output terminal of flip-flop FD03 is connected to the input of an AND gate 78 along with the output of clock source 50. Consequently, the initial clock pulse generated after state $D_4$ is defined switches the display cycle state counter to state $D_0$.

Figure 7:
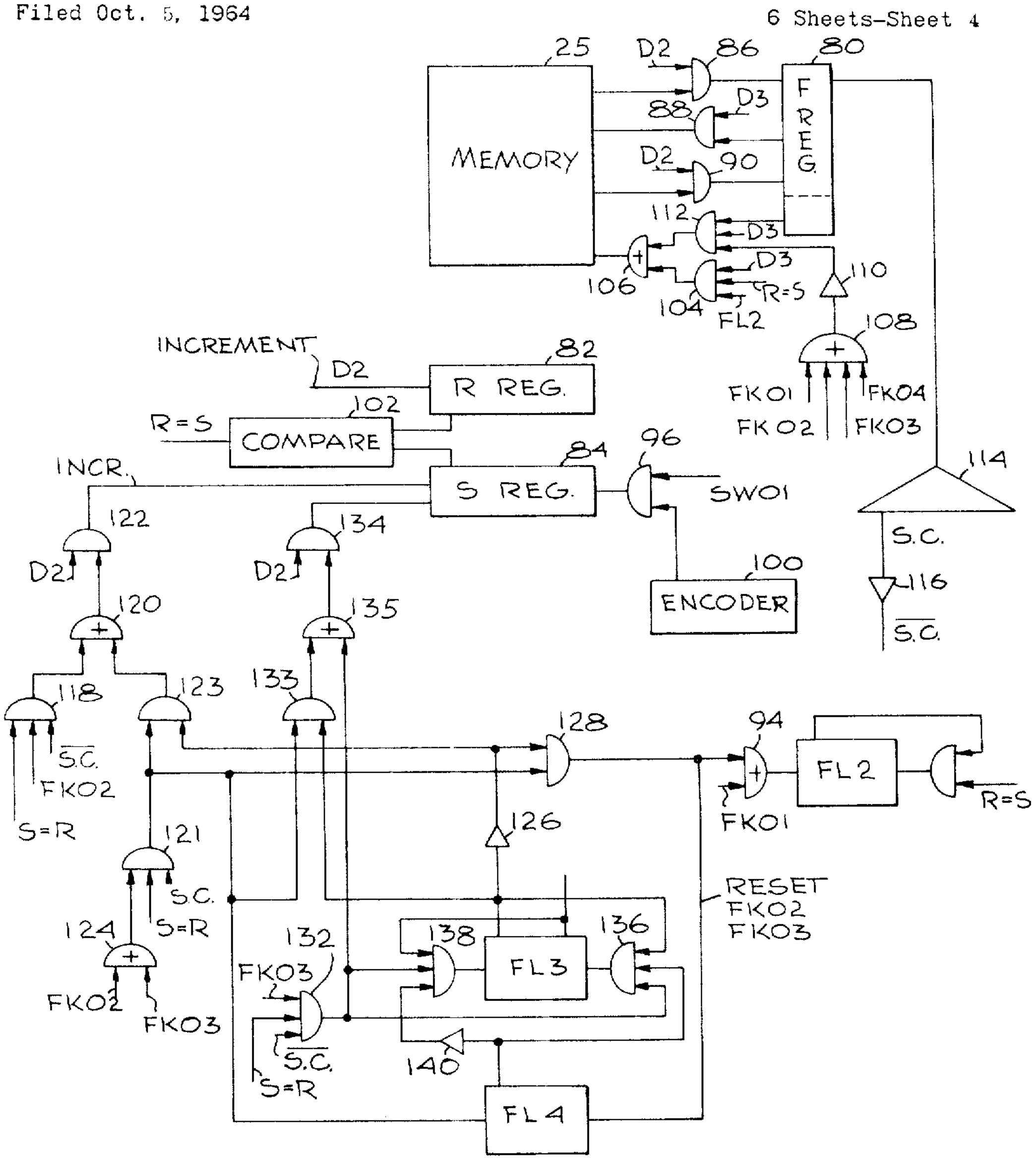
FIG. 7 is a diagram of the logic circuitry involved in operations in connection with generating a blinker.

For a better understanding of the present invention, reference is now made to FIG. 7 which is a diagram of a circuit incorporated in the present invention to control the data displayed on the surface of the cathode ray display tube 21 in response to the actuation of switches SW01 through SW04 related to the blinker. As seen from FIG. 7, the system includes the digital memory unit 25 and an F register 80, an R register 82, and an S register 84. The F register serves to store data read from and to be written into memory locations within the memory unit 25, the memory locations being identified by the address in the R register.

The S register 84 is used to continually store the address of the blinker symbol stored within the memory unit 25. Data is read during the state $D_2$ from the memory 25 into the F register 80 via an AND gate 86, and data from the F register is rewritten into the memory unit 25 during state $D_3$ via an AND gate 88. In addition, a gate 90 serves to transfer into the F register a blinker bit. When the blinker bit associated with any word is a "1," the symbol identified by that word will blink on the display tube. Blinking can be accomplished by merely varying the rate at which the blinking symbol is refreshed. Thus, if all symbols are refreshed at a rapid enough rate to make them appear stationary the blinking symbol can be refreshed at a lesser rate as by "anding" the blinker bit with the output of an oscillator. Thus, when the blinker bit is "1" and the oscillator output is "0," the symbol is not refreshed.

When a blinker is to be created so as to appear at the upper lefthand corner of the display surface, switch SW01 marked CREATE BLINKER is energized. In response thereto, key flip-flop FK01 associated with switch SW01 is set to the true condition. As a result, an OR gate 94 is energized to set a flip-flop FL2 to its true condition. Similarly, an AND gate 96 is enabled by the switch SW01 to thus transfer the contents of an encoder 100 comprising the location address of the upper lefthand corner of the display surface to the S register 84. As information is read out from the memory unit 25 during each state $D_2$, the R register 82 is incremented, so that at some time, the address in the registers 82 and 84 will be the same. Thus, a compare circuit 102 will produce an output pulse which hereinafter will indicate that R is equal to S. When such a pulse is produced, a "1" will be stored in the memory unit 25 via an AND gate 104, the three input lines of which are respectively connected to the true output of flip-flop FL2, the output of the compare circuit 102, and the state $D_3$. The output of the AND gate 104 is coupled to the memory unit 25 through an OR gate 106. Thus, a "1" will be stored in the blinker bit position of the word stored in the memory location corresponding to the upper lefthand corner of the display. All other blinker bits that may have been stored in the computer will be deleted via the action of an OR gate 108 and an inverter 110, which disables an AND gate 112 which normally returns the blinker bits to memory during state $D_3$.

The gates 108 and 112, as well as the inverter 110 serve to perform the function when the switch SW04, labeled DELETE BLINKER is energized. This is accomplished because when switch SW04 is energized, flip-flop FK04 is set to its true condition. This energizes the gate 108 which in turn inhibits, as hereinbefore explained, the AND gate 112 so that blink bits read from the memory into the F register 80 cannot be rewritten into the memory 25, thus deleting any "1's" stored in the blinker bit position of any words. As seen from FIG. 7, the OR gate 108 has two other input lines, respectively labeled FK02 and FK03, the function of which will be described hereinafter in conjunction with the operation of the switches SW02 labeled BLINKER FORWARD and SW03 labeled BLINKER BACK.

As previously explained, when switch SW02 labeled BLINKER FORWARD is actuated, the blinker moves from a first character of a certain word displayed in the upper portion of the display surface to the first character of a succeeding word displayed thereon. In order to move the blinker bit forward, so that the first character of a succeeding displayed word blinks, the position of the blinking symbol initially must be located, and then the space code which follows this position must be located, so that a "1" can be inserted in the blinker bit position of the first character of the word immediately following the space code word. This operation requires the incrementing of the S register until it defines a location storing the space code and then incrementing the S register once more. To accomplish such incrementing, a decoder 114 is provided to generate an output signal designated S.C. whenever a space code is supplied from the F register 80. The S.C. output of the decoder 114 is connected to an inverter 116 to provide an output designated $\overline{\text{S.C.}}$, such output being supplied whenever the absence of a space code is detected. An AND gate 118 has input lines connected to the compare circuit 102 and to the flip-flop FK02 which is set to the true condition when the switch SW02 is energized. In addition, the AND gate 118 has an input line connected to the output of the inverter 116 so that an output pulse from the AND gate 118 is provided during every word period in which the addresses in the S and R registers are equal and during which a space code is not read from the memory unit 25. The output of the AND gate 118 will increment the S register 84 through an OR gate 120 and an AND gate 122 having one of its inputs connected to the state $D_2$ so that incrementing will occur during the reading out cycle.

When the addresses stored in the S and R registers are equal and a space code is read from the memory 25, an output will be provided by the decoder 114, resulting in the absence of an output from the inverter 116. Consequently, the AND gate 118 will no longer provide an incrementing pulse, but instead an AND gate 121 will provide a pulse to increment the S register 84 to thus identify the memory location immediately subsequent to the located space code. The AND gate 121 is connected to the S register 84 via an AND gate 123 and the OR gate 120 and AND gate 122 hereinbefore described. One of the input lines of the AND gate 121 is connected to the output of an OR gate 124 having two input lines, respectively connected to flip-flops FK02 and FK03. The AND gate 123 has one of its input lines connected to the output of the AND gate 121, and the other input line of the AND gate 123 is connected through an inverter 126 to the true output of a flip-flop FL3 which is initially assumed to be in the false state, so that the output of the inverter 126 energizes one of the inputs of the AND gate 123. The AND gate 121 has two other input lines connected to the output of the compare circuit 102 and to the output of the decoder designated S.C. Thus, when the space code is detected and the addresses in the registers 84 and 82 are equal, an output pulse is supplied by the AND gate 121 to increment the S register 84.

The output of an AND gate 128 is connected to the OR gate 94. The two input lines of the AND gate 128 are respectively connected to the output of the inverter 126 and to the output of the AND gate 121 so that when a pulse is provided by the AND gate 121 the flip-flop FL2 is set to its true state. As soon as the addresses in the registers 82 and 84 are equal, flip-flop FL2 is reset, and a "1" bit representing the blinker will be inserted in the memory through gate 104 at the location subsequent to the location in which the space code was detected. Thus, the first character of the word succeeding the first detected space code is made to blink, thereby advancing the blinker from the first character of one word to the first character of a succeeding word. It should be noted that gate 118 will not have provided an output signal to again increment the S register, inasmuch as the address in the R register would not have equalled the address in the S register prior to the flip-flop FL2 being reset.

The operation of switch SW03 labeled BLINKER BACK may best be explained in conjunction with FIG. 7 which includes additional AND gates 132, 134, 136, and 138. In addition, the circuit diagram of FIG. 7 includes a flip-flop FL4 and an inverter circuit 140. In operation, whenever a blinker is to be backed up, namely, the blinker is to move from the first character in one word to the first character in a preceding word, it is necessary to decrement the S register 84 which stores the address of the blinker. In order to skip over the first space code which will always precede the position out of which the blinker is to be moved, the initial output pulse from the gate 132 is utilized to set the flip-flop FL3 via the AND gate 138, the other input lines of which are connected to the false output of the flip-flop FL3 and to the output of the inverter 140, which initially produces an enabling signal since the flip-flop FL4 is initially in the false state. The three input lines of the AND gate 132 are respectively connected to the output of the inverter 116, the output of the compare circuit 102, and the true output of the flip-flop FK03 associated with switch SW03. Thus, the AND gate 132 will supply a pulse to decrement the S register 84 by one address prior to the sensing of the space code which separates from the preceding word the word from which the blinker is to be moved.

During the second read cycle, the space code will be detected by the decoder 114 so that an output signal will be provided by the AND gate 121, the output of which is connected to the flip-flop FL4 thereby setting the flip-flop to its true state which in turn will reset flip-flop FL3. The initial output from gate 121 will be applied to the decrementing input terminal of the S register through OR gate 135 from AND gate 133 enabled by the true output of flip-flop FL3. With FL4 still set, further pulses from the AND gate 132 cannot set flip-flop FL3 again. As long as flip-flop FL3 was in the true state, it prevented the AND gate 120 from incrementing the S register 84 or the setting of flip-flop FL2, since during such time, the AND gates 123 and 128 are inhibited due to the absence of an output pulse from the inverter 126. However, when the subsequent space code is located, namely after the S register has been sufficiently decremented by pulses from the AND gate 132 which are supplied as long as the absence of a space code is detected, the S register will be incremented by one pulse to move it back from the space code to the succeeding address. Such an address is that of the character in which a blink bit is inserted. The pulse from the AND gate 120 which increments the S register 84 by one pulse will also set flip-flop FL2 via gates 128 and 94. With FL2 being set, a blink bit will be inserted via gates 104 and 106 into the memory. The address where such a blink bit is inserted is the address of the first character of the preceding word. Thus, when the memory in the subsequent read-out cycles supplies the information to the F register 80, a blink bit will be supplied to the first character of the preceding word thereby backspacing the blinker by one word. Both flip-flops FK02 and FK03 can be reset by the output of the AND gate 128.

Figure 8:
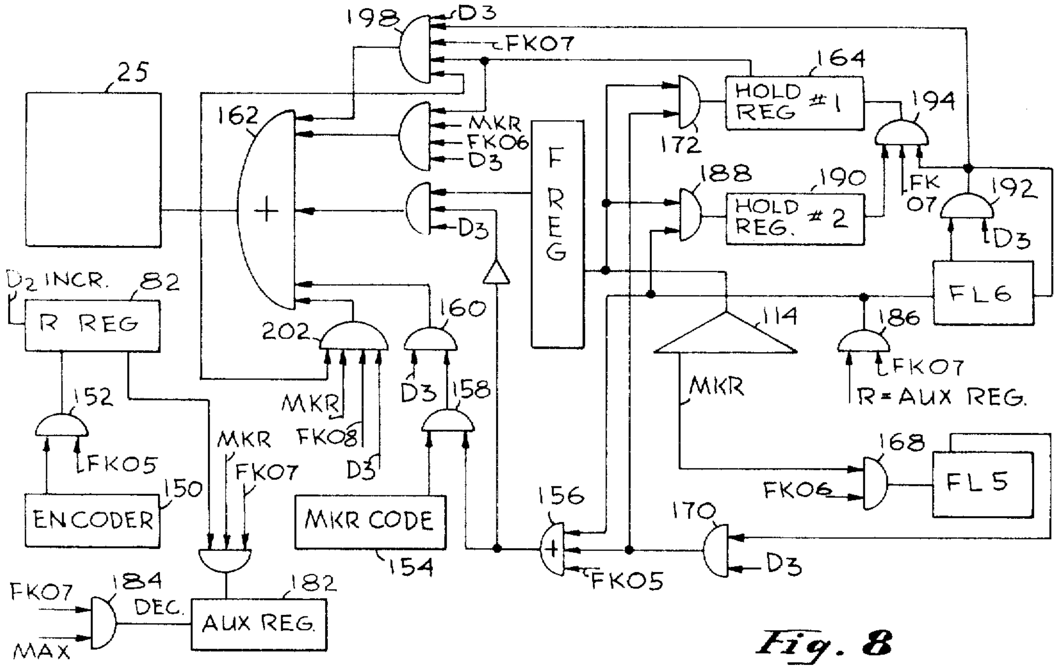
FIG. 8 is a diagram of the logic circuitry involved in operations in connection with generating a marker.

Reference is now made to FIG. 8, which is a diagram of a circuit employed to perform the functions in conjunction with switches SW05 through SW08 which are associated with the marker. As previously explained, by actuating switch SW05 labeled CREATE MARKER, a marker is displayed on the upper lefthand corner of the bottom portion of the display surface 21*a*. In operation, when switch SW05 is actuated, and flip-flop FK05 associated therewith is set, a predetermined address is entered into the R register 82 from an encoder 150 via an AND gate 152. In addition, the marker code is entered into the memory from an encoder 154, by means of OR gate 156, AND gate 158, AND gate 160 and OR gate 162. One of the inputs of OR gate 156 is connected to the true state of flip-flop FK05 so that when switch SW05 is energized, the OR gate 156 supplies an output pulse to one of the input lines of the AND gate 158, the other input line thereof being connected to the encoder 154. The pulse from the AND gate 158 is supplied to one of the inputs of the AND gate 160 during state $D_3$. The pulse from the AND gate 160 is supplied to the OR gate 162, the output of which is connected to the memory unit 25. Thus, a marker is created in accordance with the address stored in the encoder 150 which is the address of the upper lefthand corner of the bottom portion of the display surface 21*a*.

Switch SW06 is the MARKER FORWARD switch which is associated with the flip-flop FK06. In response to the actuation of switch SW06, the marker is moved to a succeeding memory location, with the former character in such location being placed in a hold register so that the character which the marker replaces is not lost. In addition, the previous character which the marker has replaced, and which had been stored in such a hold register is rewritten back into the memory in the position from which the marker is removed. This is accomplished by initially sensing the position of the marker by means of the decoder 114 which produces a marker pulse every time a marker code is detected. Assume that a hold register 164 stores a character which the marker has previously replaced. Thus, when the marker is sensed by the decoder 114 providing a marker signal, an AND gate 166, having input lines connected to the decoder 114, as well as to the hold register 164 and the true output of flip-flop FK06, is enabled to transfer the contents of the hold register to the memory.

The output from the decoder 114 is also used to set a flip-flop FL5 via an AND gate 168, the other input of which is enabled by the true output of flip-flop FK06. With flip-flop FL5 set and during the rewriting state $D_3$, an AND gate 170 is enabled to produce an output signal which is in turn supplied to one of the input lines of an AND gate 172, the other input line thereof being connected to the F register. Thus, during state $D_3$, gate 172 is enabled to transfer the contents in the F register to the hold register 164. The output of the AND gate 170 is also connected as one of the inputs to the OR gate 156 so as to store the marker code from the encoder 154 into the memory in a manner as hereinbefore described.

Thus, from the foregoing description, it is seen that when switch SW06 is energized to indicate that the marker is to be moved in a forward direction, the character which the marker has previously replaced is rewritten into the memory and the marker is advanced to a new location displacing a character which is temporarily stored in the hold register 164.

When switch SW07 is energized, namely when the marker is to be backspaced, an additional hold register is necessary to insure that none of the data that the character replaces is lost. One hold register is necessary to temporarily store the character which the marker has previously replaced, and, in addition, another hold register is necessary to temporarily store the character which the marker is about to replace. Once the marker replaces the preceding character, the space vacated by the marker is then filled by the character which was previously replaced by the marker. When switch SW07 is actuated, and the flip-flop FK07 associated therewith is set, the marker is located by means of the decoder 114 and the address in the R register 82 is transferred through a gate 180 to an auxiliary register 182. The AND gate 180 is enabled since the other two input lines thereof are connected to the marker output line of the decoder 114 and the true state of flip-flop FK07 which is set by the actuation of switch SW07.

The output of an AND gate 184 is connected to the auxiliary register 182, the input lines of gate 184 being connected to the true state of flip-flop FK07 and a particular point in the memory cycle, such as when the R register defines a maximum address, such input line being designated by MAX. When this point in the memory cycle is encountered, the AND gate 184 produces an output pulse which decrements the auxiliary register by one. Thereafter, when the R register subsequently defines an address equal to that in the auxiliary register, the two input lines to an AND gate 186 enable it to produce an output pulse which causes the contents of the F register to be transferred through an AND gate 188 to a hold register 190. In addition, the output pulse from AND gate 186 is connected as one of the input lines to the OR gate 156, thereby writing the marker code into the memory in a manner as hereinbefore described. Thus, the marker is rewritten into the memory in a location from which the character has been previously extracted and stored in the hold register 190.

The output pulse of AND gate 186 sets a flip-flop FL6, the true output of which is connected to an AND gate 192, the other input of which is connected to the state $D_3$. The output line of the AND gate 192 is connected to the reset input terminal of the flip-flop FL6 as well as to one input line of another AND gate 194. The other two input lines of AND gate 194 are connected to the true output of flip-flop FK07 and to the hold register 190. The output line of the AND gate 194 is connected to the hold register 164 so that with FK07 set and the system operating in state $D_3$ once flip-flop FL6 is set, the data stored in the hold register 190 is transferred via the AND gate 194 to the hold register 164. In addition, the output of the AND gate 192 resets the flip-flop FL6. However, prior to the transfer of data from register 190 to register 164, the contents of the register 164 which comprises the word which should go into the location from which the marker has ben extracted, will be transferred via an AND gate 198 and the OR gate 162 into the memory 25. The output line of the AND gate 198 is connected as one of the input lines to the OR gate 162, and the input lines of the AND gate 198 are connected to the output line of AND gate 192, the true output line of flip-flop FK07, the data output line of the hold register 164 and state $D_3$, so that gate 198 is enabled when flip-flop FL6 is set to cause the AND gate 192 to provide an output signal thereby enabling gate 198.

The operation of switch SW08 which causes the marker to be deleted may best be explained in conjunction with an AND gate 202 shown in FIG. 8 connected to the OR gate 162. The AND gate 202 has input lines connected to the marker output line of the encoder 114 and the true output line of flip-flops FK08. In addition, two input lines of the AND gate 202 are connected to state $D_3$ and to the output of the hold register 164. Thus, when switch SW08 is actuated, flip-flop FK08 is set to its true state. When the decoder 114 supplies a marker output signal, the AND gate 202 is enabled to transfer the content of the hold register 164 into the memory through the OR gate 162, thereby replacing the marker.

Figure 9:
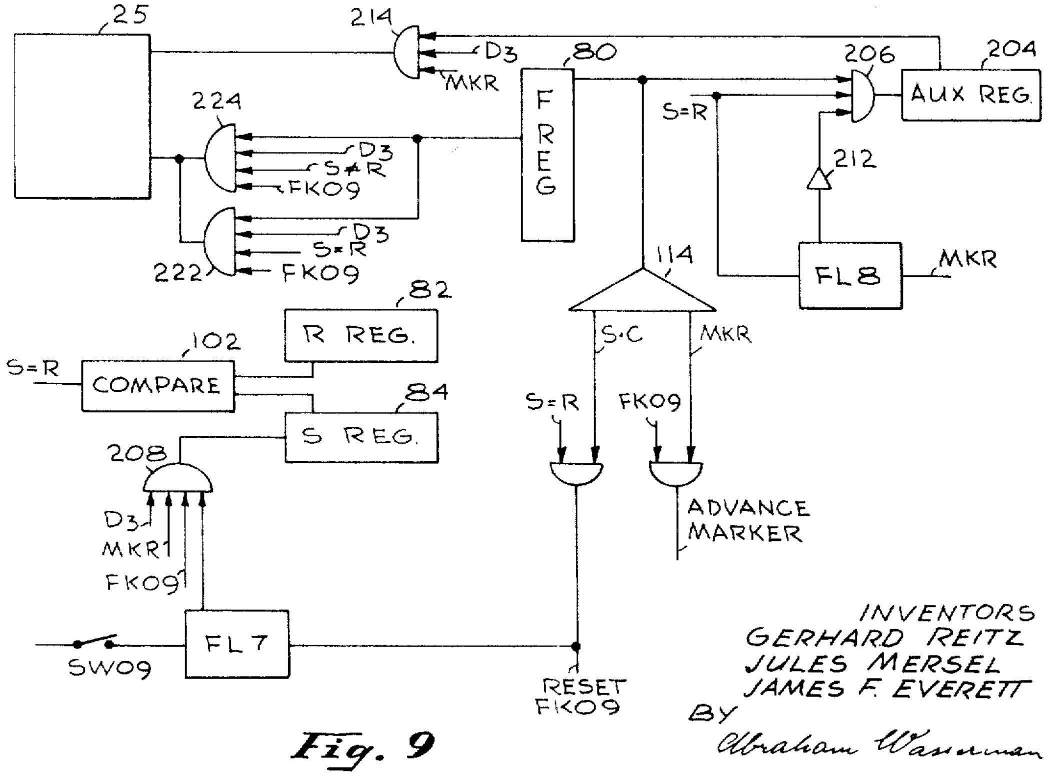
FIG. 9 is a diagram of the logic circuitry involved in a COPY WORD operation.

Reference is now made to FIG. 9, which is a diagram of circuits used in conjunction with the actuation of switch SW09 for copying a blinking word in the position of the marker displayed at the bottom half of the display surface 21*a*. As seen in FIG. 9, in addition to the memory unit 25 and registers 80, 82, and 84, the circuit further comprises an auxiliary register 204 which is connected to the output of the F register 80 through an AND gate 206. As previously explained, when the switch SW09 is actuated to copy a word, it is desired to copy the word having its first character blinking in the position of the marker. Furthermore, as previously shown, the S register 84 stores the address of the blinking character. Thus, it is necessary to first find the blinking character, temporarily store it, and then enter it into memory in place of the marker. Thereafter each successive character following the blinking character is entered into successive memory locations following the one originally storing the marker. In the circuit shown in FIG. 9, it is assumed that each character of the word to be copied is sequentially stored in the auxiliary register, and as the marker is detected, the contents of the auxiliary register is stored in the marker location. Thereafter the marker is advanced and during the subsequent reading cycle, the next character of the word to be copied is stored in the auxiliary register until the marker is again detected.

The operation continues until all the characters of the word to be copied are stored at the desired location with the marker advancing during each cycle. As seen in FIG. 9, when switch SW09 is closed, a flip-flop FL7 is set, the true output thereof being connected to one input of an AND gate 208, the other input lines of the AND gate being connected to the true output of the flip-flop FK09 associated with switch SW09, the state $D_3$ and the marker output signal from the decoder 114. Thus, when switch SW09 is closed and flip-flop FL7 is set, the AND gate 208 is enabled to increment the S register 84 by one location, when the initial marker is located. However, prior thereto when the address of the blinking character is detected, namely, when the addresses in the R register 82 and the S register 84 are the same, and a flip-flop FL8 which is connected through an inverter 212 to one of the input lines of the AND gate 206, the AND gate 206 is enabled so that the contents of the F register 80 comprising the blinking character is supplied to the auxiliary register 204.

The circuit of FIG. 9 includes another AND gate 214 having three input lines, respectively connected to the marker output of the decoder 114, to state $D_3$, and to the output of the auxiliary register 204. Thus when the marker is detected, gate 214 is enabled so that during state $D_3$ the contents of the auxiliary register 204, containing the first blinking character, is stored in the memory at the location of the marker. The marker output of the decoder 114 is supplied as one input to an AND gate 216, having another input line connected to the true output line of flip-flop FK09 which is in the true state when switch SW09 is closed. Thus gate 216 is enabled. The output of gate 216 may be supplied to circuitry similar to that described in conjunction with FIG. 8 so that every time the gate 216 is enabled, the marker advances by one address.

It is thus seen that at the end of the first cycle, the first character of the word to be copied, namely, the blinking character, is stored in the memory location where the marker had previously been stored, and in addition, the marker is advanced to a succeeding location so that the second character of the word to be copied may be supplied to the auxiliary register 204. Then when the marker location is again detected, the second character may be stored in the memory via the gate 214 and the marker again is advanced by circuitry shown in FIG. 8 which is responsive to the output signal produced by the enabled gate 216. The inverter 212 connected between the true output line of flip-flop FL8 and the input of AND gate 206 insures that only a single character can be stored in the auxiliary register 204. Then, after a marker output signal is detected, flip-flop FL8 is reset so that during the subsequent reading cycle, an additional character from the text word to be copied may be stored in the auxiliary register 204.

The operation of copying the word character by character will continue until the S register 84 is prevented from further incrementing. The incrementing of the S register 84 will terminate when the AND gate 208 is disabled as a result of flip-flop FL7 being reset by an output signal from an AND gate 220. The AND gate 220 has two input lines respectively connected to the space code (SC) of the decoder 114 and the output $S=R$ of the compare circuit 102. Thus, the gate 220 is enabled when signals appear on both of its input lines which occurs only when the blinker has been advanced to the space between the word to be copied and the succeeding word. Thus, after each of the characters of the word to be copied has been transferred to the advancing positions of the marker, namely after the entire word has been copied at the previous location of the marker, the COPY WORD operation terminates by flip-flop FK09 being reset. As seen from FIG. 9, two additional AND gates 222 and 224 are connected between the memory unit 25 and the blinker bit stored in the F register 80.

The function of AND gate 222 is to rewrite a blinker bit from the F register 80 into the memory 25 at the location of each succeeding character of the word to be copied. This is accomplished since AND gate 222 is enabled whenever the addresses in the S register 84 and the R register 82 are the same, namely, when $S=R$. Thus, as each character of the word to be copied is copied in the location of the marker, the blinker bit is stored in the succeeding character of the word, so that during the subsequent cycle, the succeeding character may be detected to be thereafter copied at the new location of the marker. On the other hand, the function of the AND gate 224 is to delete the "1" from the blinker bit position of characters which have already been copied.

Figure 10:
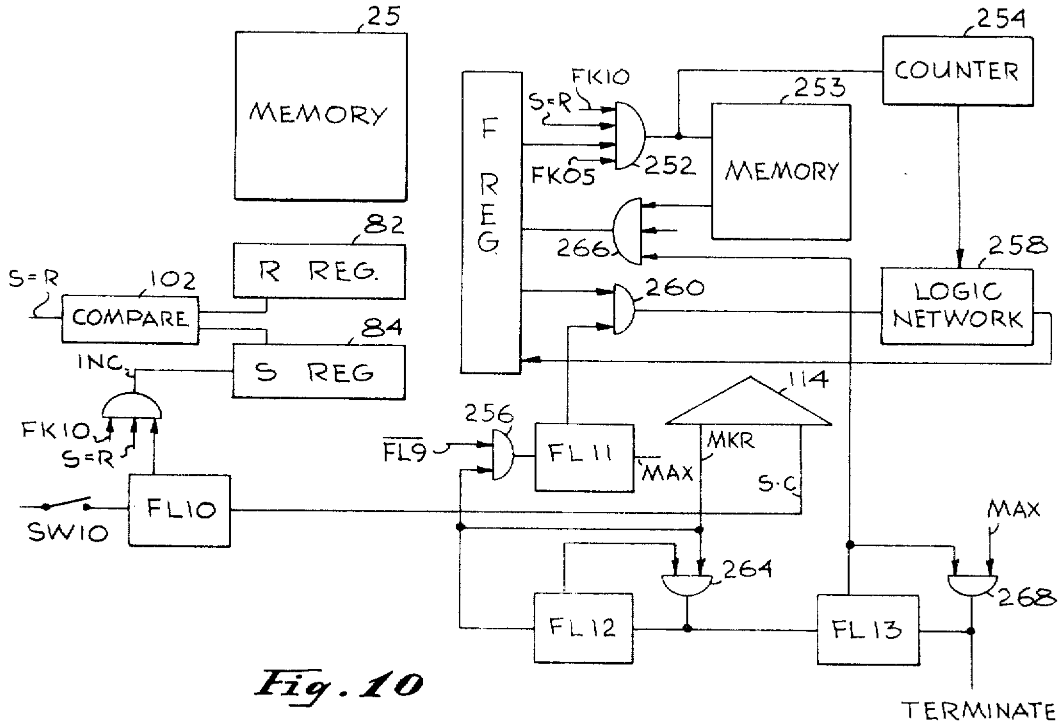
FIG. 10 is a diagram of the logic circuitry involved in an INSERT WORD operation.

Reference is now made to FIG. 10 which is a diagram of a circuit used in conjunction with switch SW10 (FIGS. 4 and 5) for inserting a word among edited words displayed on the bottom half of the display surface hereinbefore described. As previously explained, the operator, after editing a portion of the unedited translated data supplied by the translating computer 11 (FIG. 1), may decide to insert therein a word appearing on the top portion of the display surface, such word having a first blinking character. The insertion of a word within the already edited words or symbols may be accomplished by first detecting the number of spaces necessary to insert the blinking character within the edited data displayed on the bottom portion of the display. In order to be able to insert such a word, the data following the location where the word is to be inserted must be advanced by such a number of spaces as to enable the proper insertion of the word so that at no time will two characters be displayed at the same position.

As seen from FIG. 10, when the INSERT WORD switch SW10 is closed, a flip-flop FL10 is set to the true position so that the S register 84 may be incremented through an AND gate 251. Thus, the compare circuit 102 produces signals indicating that S equals R. As a result, an AND gate 252 is enabled to point data from the F register 80 to be stored in a memory 253 when the blinking character of the word to be inserted is detected. As soon as the space after the word to be inserted is detected, the decoder 114 produces a space code pulse (SC), thereby resetting flip-flop FL10 and as a consequence, the S register 84 no longer increments together with the R register 82. As a result, the gate 252 is disabled so that no additional words can be stored in the memory unit 253.

Each of the characters of the word to be inserted is counted in a counter 254. When the marker position is reached, the decoder 114 produces a marker pulse which sets a flip-flop FL11 through an AND gate 256. When flip-flop FL11 is in the true position, the information from the F register 80 is supplied to a logic network 258 through an AND gate 260. The logic network 258 is connected to the counter 254 so that each character passing through the logic network 258 is advanced by a number of positions equal to the count in the counter 254. As a consequence, the edited data displayed on the bottom portion of the display, from the position of the marker on, is displaced in a forward direction so as to produce a gap or a space in the position of the marker, the space being sufficient to have the word presently stored in the memory 253 displayed therein. At the end of the first cyclic operation, a maximum pulse resets flip-flop FL11 thereby disabling the AND gate 260.

During the second cyclic operation, when the marker is detected, the decoder 114 produces a marker pulse which sets a flip-flop FL12 to its true state. The true output of flip-flop FL12 is connected to the set input of a flip-flop FL13 through an AND gate 264. When flip-flop FL12 is in the true state, flip-flop FL13 is also set to the true state thereby enabling an AND gate 266 so that the word to be inserted, which had a first blinking character, may be transferred from the memory unit 253 to the F register 80 at the location of the marker. Thus, the word to be inserted is displayed at the desired position of the marker. At the end of the second cyclic operation, the system again produces a maximum output pulse which resets flip-flop FL13 through an AND gate 266 which also terminates the operation of INSERT WORD.

From the foregoing description, it is seen that according to the teachings of the present invention, in addition to providing means for creating a blinking character in the data provided from the translating computer which is displayed on the top portion of the display surface, and producing a marker symbol on the bottom portion of the display surface, the present invention also provides a means for copying the word having a first blinking character or inserting such word at the position of the marker. When a word having a first blinking character is copied, it is merely displayed at the position of the marker where no previous data was displayed. However, when a word is inserted at the position of the marker, in addition to properly displaying the inserted word, means are also provided for shifting all the data to follow the inserted word so that at no time are two characters displayed at the same location.

As seen from FIGS. 1, 2, and 4, the present invention further includes an alphanumeric keyboard 22 and switches SW11 labeled ALPHANUMERIC KEYBOARD COPY and SW12 labeled ALPHANUMERIC KEYBOARD INSERT. When words or expressions which are not automatically supplied by the translating computer are to be included in the final translated data, these switches may be activated to copy or insert such words into the finally edited data displayed on the bottom portion of the display surface at the position indicated by the marker. By actuating the keys on the alphanumeric keyboard 22, which is similar to a typewriter, signals related to the characters are produced and temporarily stored in an auxiliary memory, similar to the auxiliary register 204, or the memory unit 253 shown in FIGS. 9 and 10, respectively. Thus, instead of copying or inserting a word having a first blinking character in the position of the marker, the data supplied from the auxiliary memory is used to be displayed at such position. As a result, the edited data on the bottom portion of the display surface may include not only data available from the translating computer, but also additional data which was not included due to the linguistic and grammatical limitations of the translating computer.

Figure 11:
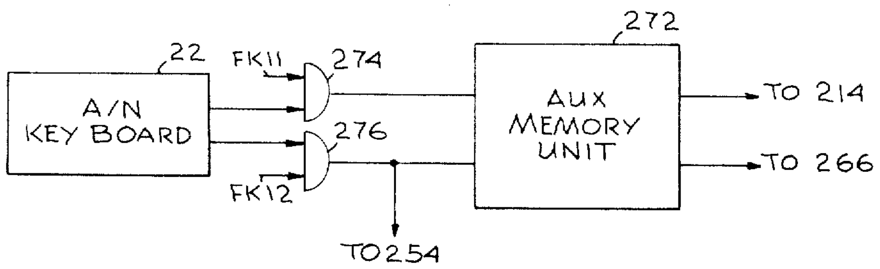
FIG. 11 is a simplified block diagram involved with A/N COPY and A/N INSERT operations.

As seen from FIG. 11, to which reference is made, the alphanumeric keyboard 22 is connected to an auxiliary memory unit 272 through AND gates 274 and 276. When a word is to be copied at the position of the marker by actuating the alphanumeric keyboard 22 and switch SW11, gate 274 is enabled so as to permit signals from the alphanumeric keyboard 22 to be supplied to the auxiliary memory unit 272. Therefore, the word temporarily stored in the unit 272 is supplied to the AND gate 214 in a manner similar to that in which a word is supplied thereto from the auxiliary register 204 hereinbefore described in conjunction with FIG. 9.

When a word provided from the alphanumeric keyboard is to be inserted at the position of the marker switch SW12 is energized so that gate 276 is enabled to permit signals produced by the alphanumeric keyboard 22 to be supplied to the auxiliary memory unit 272 as well as to the counter 254 (FIG. 10). When a word provided from the alphanumeric keyboard is to be inserted at the position of the marker, the data temporarily stored in the memory unit 272 is supplied to the AND gate 266 from the memory unit in a manner similar to the data supplied by the memory 253 hereinbefore described in connection with FIG. 10. It is thus seen that as well as copying or inserting words supplied by the translating computer, the teachings of the present invention further provide means for producing additional words which the operator or editor may create by actuating the alphanumeric keyboard 22 and thereby include such additional words in the final edited output.

The control keyboard 23 (FIGS. 1, 2 and 4) further includes switches SW13, SW14 and SW15 which actuate the system so as to initiate various operations. For example, switch SW13 starts the system by energizing the various circuits. SW14, a CLEAR MEMORY switch, is used whenever the data stored in the memory 25 is to be erased in order to store new data therein. This may be easily accomplished by inhibiting data supplied from the F register 80 from being reread into the memory unit 25 during state $D_3$. Similarly, switch SW15 is used whenever it is desired to store new data in the memory 25 which is supplied thereto from the translating computer 11.

Summarizing briefly, the present invention relates to a method and system of editing automatically translated data to provide related data of acceptable standards. Means are provided to automatically translate data supplied in an input language into translated data in an output language. The translated data or any selected portion thereof is then displayed on a display console. An editor or operator viewing the display of machine translated data has at his command actuatable controls to identify any word in the displayed data which he may want to include in the edited data. This is accomplished by providing means for the operator to cause the blinking of the first character of the desired work.

The operator can also produce a marker symbol indicating where in the edited data the selected word is to be included. Means are provided for producing words or symbols not available from the translating computer. Thus, an editor may include in the edited data, which is the final desired output, data which the translating computer, due to its translation limitations, could not provide. The editor once satisfied with the edited data which is displayed in front of him, may provide a record thereof and thereafter display new data to be edited.

In addition to displaying the translated data provided from the translating computer, there may be instances where the operator may want to view the original data in the input language. This may conveniently be accomplished by storing in the translating computer, as well as the memory unit 25, not only the translated data in the output language, but also the original data in the input language. Thus, the operator may display the data in either or both languages.

Although specific embodiments of the invention have been illustrated and described, it is apparent that many modifications may be made by one skilled in the art without departing from the true spirit and scope of the invention.

What is claimed is:

1. A translation system comprising:

means responsive to data presented in a first language for automatically translating said data to provide manifestations representing equivalent translated data in a second language;

display means including a display surface having first and second areas and responsive to said manifestations for displaying said translated data on said first area of said display surface;

first actuatable means;

second actuatable means;

control means responsive to the actuation of said first actuatable means for displaying at least some of said displayed translated data on said second area of said display surface;

said control means being further responsive to the actuation of said second actuatable means for displaying additional data on said second area of said display surface together with at least some of the translated data being displayed thereon; and means for recording said translated data displayed on said second area of said display surface.

2. The system defined by claim 1 wherein said control means include means responsive to the actuation of said first actuatable means for displaying symbols so as to identify said at least some of said translated data displayed on said first area to be displayed on said second area of said display surface of said display means, and further including means responsive to the actuation of said second actuatable means to provide signals characteristic of additional data other than said translated data displayed on said first area, said control means being responsive to said signals so as to display said additional data together with at least some of the translated data being displayed thereon.

3. A translation system comprising:
means responsive to data presented in a first language for automatically translating said data to provide manifestations representing equivalent translated data in a second language;
means including storing means responsive to said automatically translated data for storing at least a portion of said data therein;
display means including first and second display surfaces and responsive to said portion of said automatically translated data stored in said means including storing means for displaying said automatically translated data on said first display surface thereof;
a first plurality of actuatable control keys;
a second plurality of actuatable control keys;
control means responsive to the actuation of said first plurality of actuatable control keys for energizing said means including storing means to display on said second display surface at least some of the automatically translated data displayed on said first display surface;
said control means being further responsive to the actuation of said second plurality of actuatable control keys for energizing said means including storing means to further display on said second display surface additional data in said second language together with some of the automatically translated data being displayed thereon so as to provide edited translated data in said second language; and
means for recording the edited translated data in said second language being displayed on said second surface.

4. The system defined by claim 3
wherein the actuation of said first plurality of actuatable control keys energizes said control means so as to modify the display on at least said second display surface by selecting at least some of the automatically translated data and rearranging said data in accordance with linguistic characteristics of said second language, and wherein said second plurality of actuatable control keys comprise at least alphanumeric control keys for adding data in said second language to be displayed on said second surface, the added data not having been automatically translated by said system.

5. The system defined by claim 3 wherein said control means include means responsive to the actuation of said first plurality of actuatable control keys to energize said means including storing means and said display means including first and second display surfaces to display first and second symbols thereon, respectively, said first symbol being displayed to identify at least some of said automatically translated data being displayed on said first display surface, and said second symbol being displayed to indicate a position on said second display surface wherein said identified translated data is to be further displayed.

6. The system defined by claim 5 wherein said control means include means responsive to the actuation of said second plurality of actuatable control keys to display on said second display surface at the position of said second symbol additional data other than said automatically translated data displayed on said first display surface.

7. In combination with a source providing input signals representing successive elemental portions of an input message expressed in a first language, apparatus coupled to said source for providing output signals representing successive elemental portions of a corresponding output message expressed in a second language, said apparatus including:
first means storing manifestations representing a plurality of elemental portions of said first language and manifestations representing substantially equivalent elemental portions of said second language;
second means storing data related to the linguistic and grammatic characteristics of said first and second languages;
third means responsive to said successive elemental portions represented by said input signals and said data stored by said second means for deriving from said first means output manifestations representing elemental portions of said second language substantially equivalent to said elemental portions represented by said input signals;
fourth means including a first display surface responsive to said output manifestations for displaying on said first display surface the elemental portions of said second language represented thereby;
actuatable control means;
a second display surface; and
means responsive to the selective actuation of said control means for copying onto said second display surface selected elemental portions displayed on said first display surface and for displaying additional data on said second display surface.

8. The combination of claim 7 including means for recording said data displayed by said second display surface.

9. The combination of claim 7 including means responsive to the selective actuation of said control means for displaying and selectively positioning a symbol on said first display surface identifying a portion of said translated data to be copied.

10. The combination of claim 7 including means responsive to the selective actuation of said control means for displaying and selectively positioning a symbol on said second display surface identifying a position thereon at which said additional data or said translated data to be copied is to be displayed.

References Cited

UNITED STATES PATENTS

| | | | |
|---|---|---|---|
| 3,166,636 | 1/1965 | Rutland | 178—24 |
| 3,248,705 | 4/1966 | Damann | 340—172.5 |

ROBERT C. BAILEY, *Primary Examiner.*

R. B. ZACHE, *Assistant Examiner.*